United States Patent
Langley et al.

(10) Patent No.: US 10,986,826 B2
(45) Date of Patent: Apr. 27, 2021

(54) CONTAINER FOR STORING SPINNERBAIT FISHING LURE

(71) Applicant: Mafia Outdoors, LLC, Russellville, AR (US)

(72) Inventors: J. Barton Langley, Russellville, AR (US); Jeremy S. Starks, Scott Depot, WV (US)

(73) Assignee: Mafia Outdoors, LLC, Russellville, AR (US)

( * ) Notice: Subject to any disclaimer, the term of this patent is extended or adjusted under 35 U.S.C. 154(b) by 363 days.

(21) Appl. No.: 15/644,432

(22) Filed: Jul. 7, 2017

(65) Prior Publication Data

US 2018/0007883 A1    Jan. 11, 2018

Related U.S. Application Data

(60) Provisional application No. 62/360,177, filed on Jul. 8, 2016.

(51) Int. Cl.
| | |
|---|---|
| *A01K 97/06* | (2006.01) |
| *B65D 43/16* | (2006.01) |
| *B65D 43/22* | (2006.01) |
| *B65D 53/02* | (2006.01) |
| *B65D 25/10* | (2006.01) |

(52) U.S. Cl.
CPC ............ *A01K 97/06* (2013.01); *B65D 25/106* (2013.01); *B65D 43/163* (2013.01); *B65D 43/22* (2013.01); *B65D 53/02* (2013.01)

(58) Field of Classification Search
CPC ...................................................... A01K 97/06

USPC ........... 43/54.1; 206/315.11, 0.8, 0.81, 0.82, 206/0.83, 0.84, 307, 307.1, 308.3, 206/309–313; 224/922
See application file for complete search history.

(56) References Cited

U.S. PATENT DOCUMENTS

| | | | | |
|---|---|---|---|---|
| 994,419 | A * | 6/1911 | Metzger | B65D 85/185 206/290 |
| 1,403,939 | A * | 1/1922 | Cox | B42F 15/0005 312/9.59 |
| 1,490,422 | A * | 4/1924 | Frank | B42F 15/0005 312/9.61 |
| 1,574,416 | A * | 2/1926 | Campbell | A01K 97/06 43/54.1 |
| 2,020,394 | A * | 11/1935 | Bates | B65D 83/02 206/362 |
| 2,253,598 | A * | 8/1941 | Africa | A01K 97/06 43/57.1 |
| 2,634,730 | A * | 4/1953 | Hoffman | B42F 17/02 402/79 |
| 2,827,166 | A * | 3/1958 | Evans, III | B42F 5/04 206/0.83 |

(Continued)

FOREIGN PATENT DOCUMENTS

| | | | | |
|---|---|---|---|---|
| DE | 3047930 A1 * | 7/1982 | | A01K 97/06 |
| DE | 3318207 A1 * | 1/1985 | | A01K 97/06 |

(Continued)

*Primary Examiner* — Darren W Ark
(74) *Attorney, Agent, or Firm* — Richard Blakely Glasgow

(57) ABSTRACT

A durable and waterproof spinnerbait storage container having storage bags secured to a rod extending across the length of an internal compartment of the storage container such that each storage bag may hold a spinnerbait lure separately from other spinnerbait lures.

8 Claims, 3 Drawing Sheets

(56) References Cited

U.S. PATENT DOCUMENTS

| | | | | |
|---|---|---|---|---|
| 2,878,849 A * | 3/1959 | Lingenfelter | B65D 33/00 | 383/9 |
| 2,983,387 A * | 5/1961 | Klein | B42F 15/0005 | 211/40 |
| 3,395,788 A * | 8/1968 | Gill | B65D 11/00 | 206/315.11 |
| 3,398,839 A * | 8/1968 | Ballenger | A47F 5/0006 | 211/85.15 |
| 3,493,101 A * | 2/1970 | Collin | B65D 85/185 | 206/280 |
| 3,628,843 A * | 12/1971 | Wynne | A01K 97/06 | 312/294 |
| 4,033,066 A * | 7/1977 | Morcom | A01K 97/04 | 43/54.1 |
| 4,111,297 A * | 9/1978 | Paulin | B65D 5/54 | 206/526 |
| 4,467,551 A * | 8/1984 | Pulver | A01K 97/06 | 206/315.1 |
| 4,577,433 A * | 3/1986 | Jones | A01K 97/06 | 43/57.2 |
| 4,691,469 A * | 9/1987 | Alsobrook | A01K 97/06 | 206/315.11 |
| 4,693,369 A * | 9/1987 | Lagin | B65D 85/185 | 206/289 |
| 4,708,243 A * | 11/1987 | Nailon | A01K 97/06 | 150/111 |
| 4,829,699 A * | 5/1989 | Perkins | A01K 97/06 | 43/54.1 |
| 4,852,293 A * | 8/1989 | Levine | A01K 97/06 | 43/54.1 |
| 4,927,016 A * | 5/1990 | Fuller | A01K 97/06 | 206/315.11 |
| 4,936,044 A * | 6/1990 | Bruce | A01K 97/06 | 43/57.1 |
| 5,025,588 A * | 6/1991 | Echols | A01K 97/06 | 206/315.11 |
| 5,095,645 A * | 3/1992 | Borawski | A01K 97/06 | 206/315.11 |
| 5,123,197 A * | 6/1992 | Gentry | A01K 97/06 | 206/315.11 |
| 5,289,940 A * | 3/1994 | Wisenbaugh | A01K 97/06 | 206/315.1 |
| 5,297,354 A * | 3/1994 | McGriff | A01K 97/06 | 43/4 |
| 5,475,943 A * | 12/1995 | Hodges | A01K 97/06 | 43/57.1 |
| 5,505,354 A * | 4/1996 | Hutton | A01K 97/06 | 224/196 |
| 5,632,113 A * | 5/1997 | Raymond | A01K 97/06 | 43/54.1 |
| 5,655,660 A * | 8/1997 | Dolin | B65D 5/38 | 206/493 |
| 5,704,158 A * | 1/1998 | Whiteaker | A01K 97/06 | 206/315.11 |
| 5,956,881 A * | 9/1999 | Dehm | A01K 97/00 | 43/4 |
| 5,975,002 A * | 11/1999 | Rieger | B63B 35/14 | 114/343 |
| 6,516,555 B2 * | 2/2003 | Buzzell | A01K 97/06 | 43/57.1 |
| 6,527,113 B2 * | 3/2003 | Blake | A01K 97/06 | 206/315.11 |
| 6,530,488 B1 * | 3/2003 | Krammes, Jr. | A01K 97/06 | 206/806 |
| 6,550,613 B2 * | 4/2003 | Amato | A01K 97/06 | 206/315.11 |
| 6,644,482 B2 * | 11/2003 | Ku | G11B 33/0444 | 206/308.1 |
| 6,694,667 B2 * | 2/2004 | Davis | A01K 97/06 | 225/47 |
| 6,889,469 B1 * | 5/2005 | Chung | A01K 97/06 | 43/57.1 |
| 7,080,920 B2 * | 7/2006 | Fitzsimmons | A01K 97/06 | 362/155 |
| D551,892 S * | 10/2007 | Huang | D6/629 | |
| 7,380,367 B1 * | 6/2008 | Andrews | A01K 97/06 | 43/57.1 |
| 7,726,472 B1 * | 6/2010 | Duvuvuei | A01M 31/004 | 206/207 |
| 7,748,158 B2 * | 7/2010 | Wieringa | A01K 97/06 | 206/315.11 |
| 7,908,789 B2 * | 3/2011 | Dobbs | A01K 97/045 | 43/54.1 |
| 7,937,884 B1 * | 5/2011 | Naylor | A01K 97/06 | 206/315.11 |
| 8,327,576 B2 * | 12/2012 | Sellers | A01K 97/04 | 220/560 |
| 8,701,912 B2 * | 4/2014 | Carnevali | B63B 49/00 | 206/315.11 |
| 9,883,665 B2 * | 2/2018 | Heaton | A01K 97/06 | |
| 2002/0134694 A1 * | 9/2002 | Cherng | G11B 33/045 | 206/308.1 |
| 2004/0011685 A1 * | 1/2004 | Lux, Jr. | G11B 33/0422 | 206/312 |
| 2006/0021886 A1 * | 2/2006 | Ikegami | G11B 33/0422 | 206/311 |
| 2011/0031140 A1 * | 2/2011 | Clishem | A47B 46/00 | 206/289 |

FOREIGN PATENT DOCUMENTS

| | | | | |
|---|---|---|---|---|
| FR | 2553641 A1 * | 4/1985 | | A01K 97/06 |
| GB | 222296 A * | 10/1924 | | A01K 97/06 |
| JP | 08107742 A * | 4/1996 | | |
| JP | 09294509 A * | 11/1997 | | |
| JP | 11289944 A * | 10/1999 | | |
| JP | 2003289779 A * | 10/2003 | | |
| JP | 3748745 B2 * | 2/2006 | | |
| JP | 3131928 U * | 5/2007 | | |
| JP | 2007143496 A * | 6/2007 | | |
| JP | 2007195500 A * | 8/2007 | | |
| JP | 2010166864 A * | 8/2010 | | |
| WO | WO-0010421 A1 * | 3/2000 | | A01K 97/06 |
| WO | WO-2015148681 A1 * | 10/2015 | | |

* cited by examiner

CONTAINER FOR STORING SPINNERBAIT FISHING LURE

CROSS-REFERENCE TO RELATED APPLICATIONS

This application claims the benefit of U.S. Provisional Patent Application No. 62/360,177, entitled "Spinnerbait Storage Box" and filed on Jul. 8, 2016. The complete disclosure of said provisional application is hereby incorporated by reference.

STATEMENT REGARDING FEDERALLY SPONSORED RESEARCH OR DEVELOPMENT

Not applicable

BACKGROUND OF THE INVENTION

Recreational fishing is an activity enjoyed by tens of millions of people each year. In fact, some reports estimate that nearly forty-six million Americans participate in fishing activities in any given year. An average fishing participant is estimated to fish approximately 19.4 outings per year, with total combined fishing outings estimated at approximately 893 million times per year. While many of these fishermen cite the rush of catching a fish, the joys of the sights and sound of nature, and spending time with family as the best things about fishing, many fishermen say that one of the worst things about fishing is not having the right equipment.

Fishing tackle, a broad term used to refer to the equipment or gear used for catching fish, is essential for successful fishing. One popular fishing tackle is known as the "spinnerbait," which get its name from metal blades that spin like a propeller when the lure is in motion in order to look like a live fish. Spinnerbaits are often considered one of the most versatile types of lures because they can be used in a variety of conditions. Spinnerbaits can be used in different seasons, different water temperatures, different water depths, and can even be used around various types of cover. While spinnerbaits are versatile, different types of spinnerbaits are especially suited for various fishing situations. For example, one type of spinnerbait may be better suited for fishing around grass or brush and another type may be better suited for use as a drop-bait. Given the number of different types of spinnerbaits, and the benefits of using different types of spinnerbaits in different fishing conditions, a storage box is a vital piece of equipment for people who engage in fishing activities.

Current spinnerbait storage boxes are bulky and awkward to store in a boat compartment. The current styles do not secure the bait and, if the box is tipped on its side or on its top, then all of the contents are spilled and become entangled. The styles currently being manufactured are made from a semi-transparent polypropylene, are poorly made, are fragile, and are not water-resistant or waterproof. As a result, baits easily become tangled, damaged, or are continuously covered in rust. An improved spinnerbait storage container is desired for reducing or eliminating tangling, damaging, and rusting of spinnerbait lures.

DETAILED DESCRIPTION OF THE INVENTION

Figure 1:
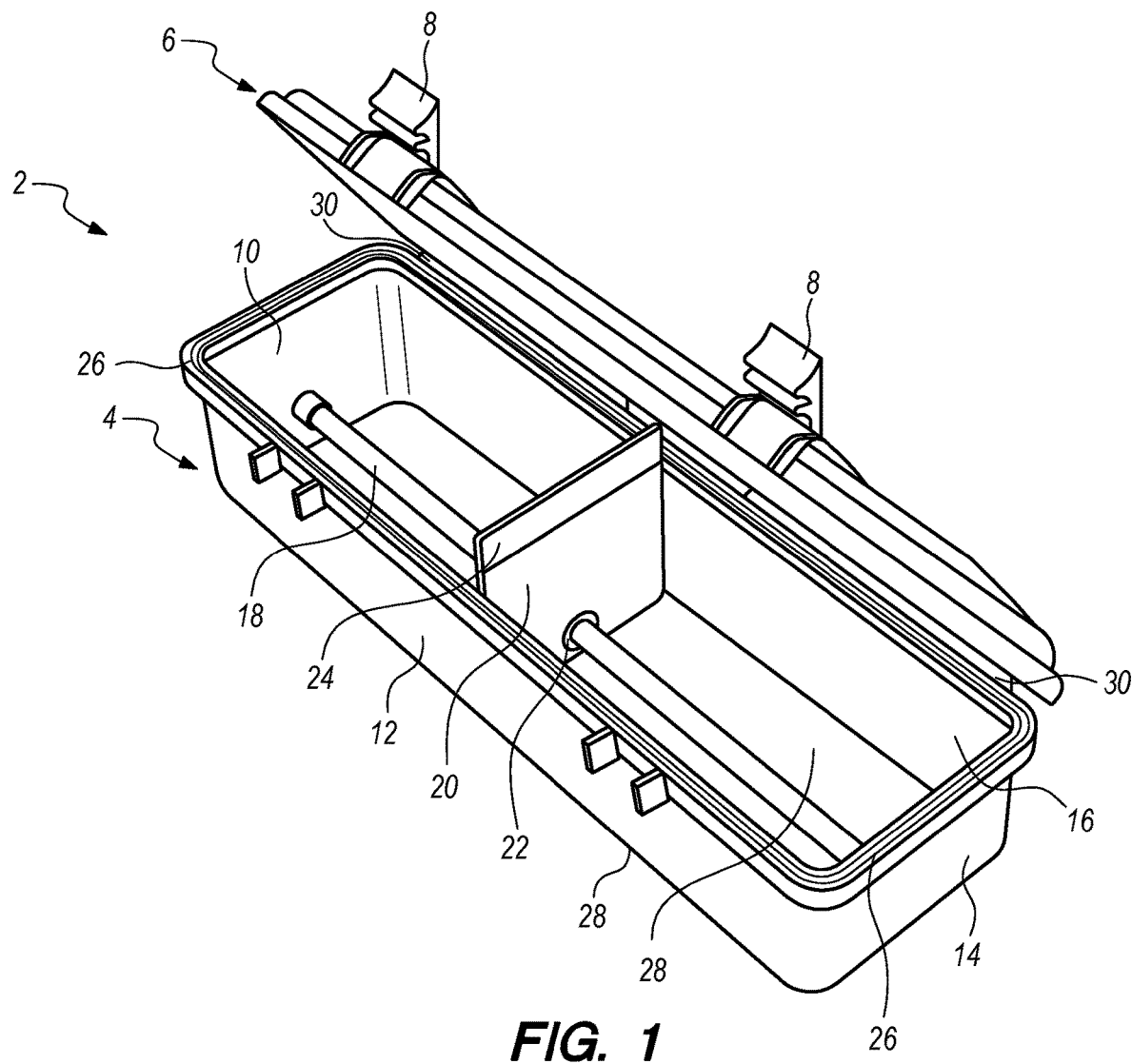
FIG. 1 is a perspective view of the spinnerbait storage container of the present invention in the open position.
Figure 2:
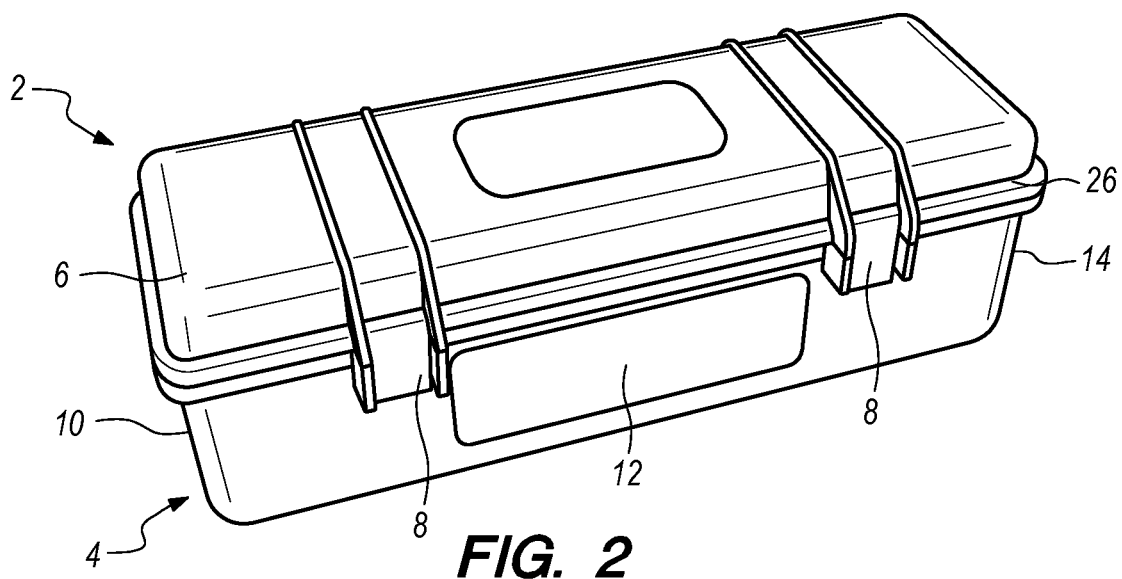
FIG. 2 is a perspective view of the spinnerbait storage container of the present invention in the closed position.
Figure 3:
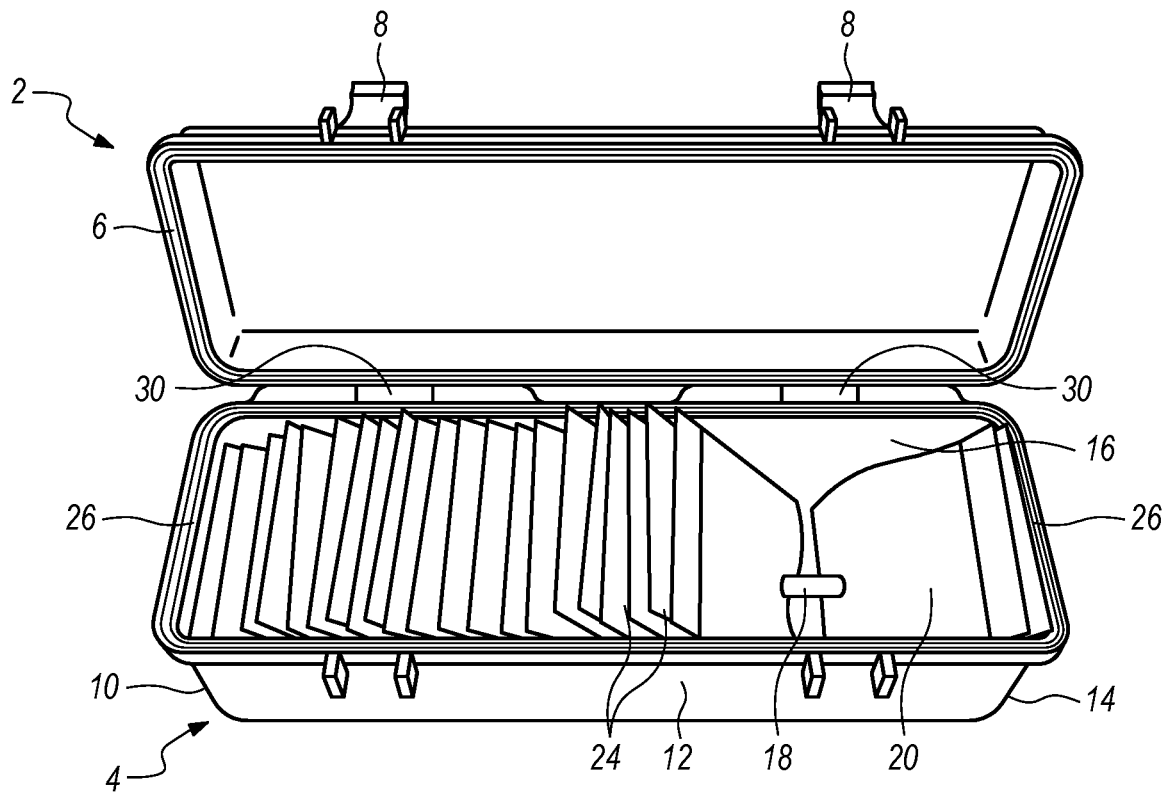
FIG. 3 is a perspective view of the spinnerbait storage container of the present invention in the open position and showing a plurality of storage bags inside the compartment.
Figure 4:
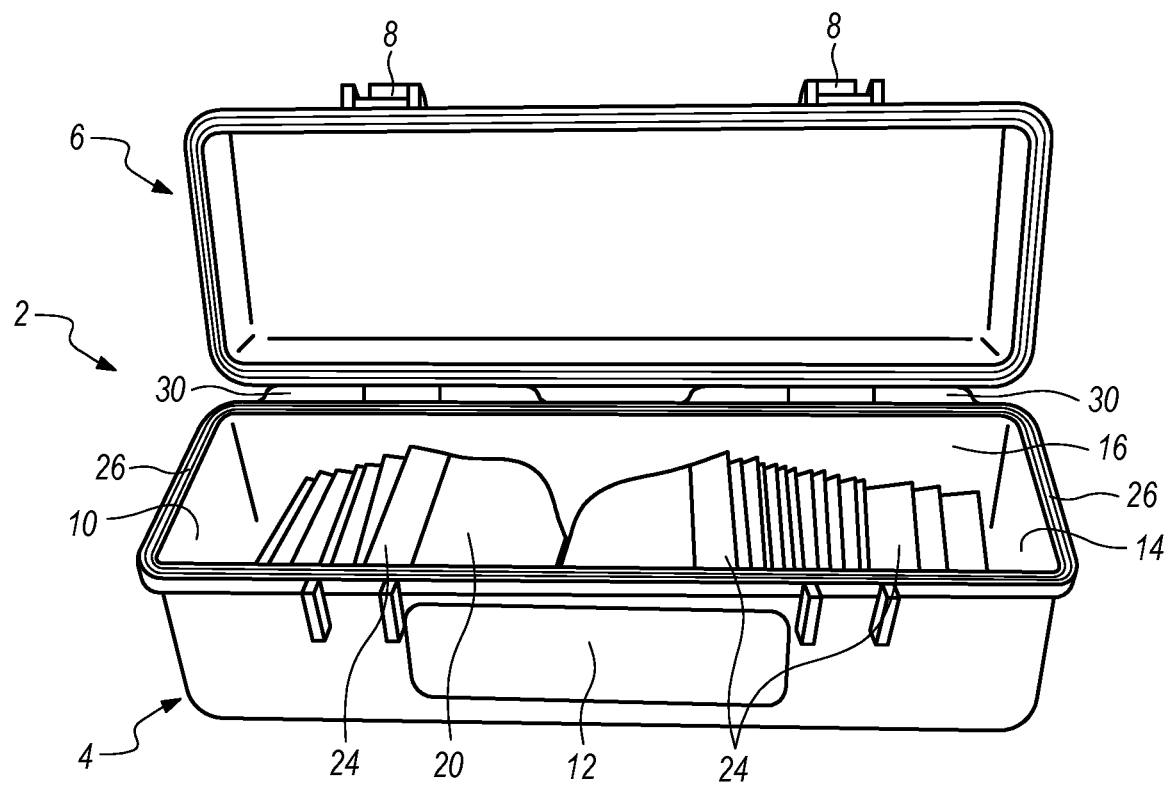
FIG. 4 is a perspective view of the spinnerbait storage container of the present invention in the open position and showing a plurality of storage bags inside the compartment.

The present invention is directed to fishing products and more particularly to a durable storage container for holding a quantity of fishing lures. While the preferred embodiment of the present invention is configured to store spinnerbait style fishing lures, it is understood that any variety of baits may be used with the storage container described herein, including jigs.

With reference to FIGS. 1-5, the preferred embodiments of the spinnerbait storage container of the present invention may be described. The storage container 2 is made up of a bottom compartment section 4 and a lid 6. The compartment section 4 has outer walls (a left side wall 10, a front side wall 12, a right side wall 14, and a back side wall 16) and a bottom surface 28 connecting the bottom of the outer walls 10, 12, 14, 16 to form an internal compartment. The internal compartment is configured to store a number of spinnerbait lures or other products. The preferred embodiment of the storage container 2 of the present invention has exterior dimensions of approximately fourteen inches long (length of front side wall 12 and back side wall 16), approximately five inches wide (length of left side wall 10 and right side wall 14), and approximately five inches in height (height of walls 10, 12, 14, 16). These exterior dimensions provide for a longer and less bulky profile, which allows the storage container 2 to universally fit into any boat storage area or box (not shown). It is understood, however, that the shape and size of the storage box can be changed to accommodate various fishing needs. In one embodiment, the storage container 2 has an upper lip 26 on the top side of the outer walls 10, 12, 14, 16, which helps facilitate a watertight seal when the lid 6 (discussed below) is closed and secured.

The storage container 2 of the present invention has a rod 18 inside the internal compartment, preferably extending from the left side wall 10 to the right side wall 14. This rod 18 is configured to act as a holding mechanism for storage bags 20 or sleeves, which are used to store individual spinnerbait lures. These bags 20 slide along the rod 18 effectively creating a "filing system" for the spinnerbaits or other lures contained inside the bags 20. The bags 20 and rod 18 are configured such that the bags 20 can be slid back and forth along the rod 18 so that the user can find the appropriate bait needed for a particular fishing situation. In the preferred embodiment, the rod 8 is a stainless steel rod, but any sturdy and durable material may be used. Furthermore, in the preferred embodiment, the rod 18 is configured to hold approximately twenty-five poly bags 20, which in turns allows for storage of twenty-five different spinnerbait lures. It is understood, however, that a greater or lesser number of spinnerbaits may be stored by changing the dimensions of the storage container 2 and by modifying the number of rods 18 and storage bags 20 used inside the container 2.

The storage bags 20 are preferably made from 10-mil pvc blend and are clear in color. This allows the user of the container 2 to see the spinnerbait stored inside the bags 20 without opening the bags 20, which ultimately gives the user the freedom to easily and effectively choose the desired spinnerbait when fishing. The bags 20 are configured such that the storage rod 18 extends through a hole 22 in the side of each of the bags 20, therefore securing the bags 20 to the storage rod 8. Each hole 22 is preferably located near the bottom of each bag 20, which allows the bags 20 to be secured to the storage rod 8 but also maximizes the amount of space in the bags 20 that a spinnerbait may be stored. There is an opening extending along the top of each bag 20 that allows the bags 20 to be opened so that spinnerbaits can be inserted and removed from the bags 20.

Figure 5:
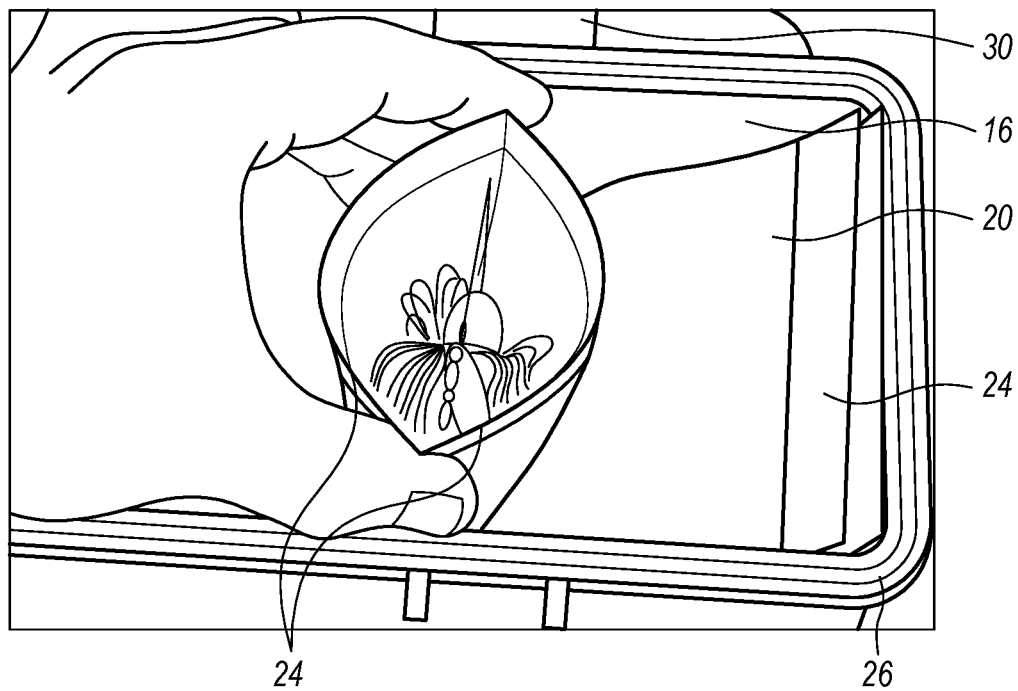
FIG. 5 is a top view showing one of the storage bags inside the compartment being opened according to the present invention.

In the preferred embodiment, the top openings of each bag 20 contain a plastic closing piece 24 molded into the lip of the bag opening. This closing piece 24 is configured to act as a spring-like attachment so that the storage bags 20 can self-close when the user has inserted or removed a spinnerbait from the bag 20. This allows the bags 20 to close automatically and therefore spinnerbaits will not spill from the bags 20 when the storage container 2 is moved. The use of individual storage bags 20 to store individual spinnerbait lures keeps the spinnerbait lures from becoming tangled and damaged, as the spinnerbaits do not come into contact with any other spinnerbaits. To open the individual bags 20, the user may grasp opposite ends of the top opening with his fingers and push inward, which bends the closing piece 24 and therefore opens the bag 20, as shown in FIG. 5.

The lid 6 of the storage container 2 acts as the top surface of the storage container 2, which allows the storage container 2 to be transported without losing the contents of the internal compartment section 4. However, because the storage bags 20 are configured to close automatically, even with the lid 6 open the baits are held securely and will not spill from the container 2. The lid 6 thus acts as a second line of protection from losing spinnerbait lures, or may be particularly useful in embodiments in which the bags 20 do not contain the closing piece 24. Furthermore, the lid 6 has a sealing ring that is used to create a water-tight seal when the lid 6 is closed. This creates a waterproof storage container 2 when the lid is closed, which ultimately serves to keep the baits free of rust. As discussed above, one embodiment of the storage container 2 has a lip 26 on the upper portion of the outer walls 10, 12, 14, 16. The lid 6 and sealing ring on the inside of the outer edges of the lid 6 are configured to fit securely around this lip 26 which further facilitates waterproofing of the container 2.

The storage container 2 is preferably created from an acrylonitrile butadiene styrene (ABS) materiel that is extremely durable and crush resistant. In the preferred embodiment, the lid 6 is hingedly connected to the storage compartment 4. Specifically, the lid 6 is hingedly attached using a set of hinges 30 that connect the lid 6 to the back wall 16 of the storage compartment 4 at opposite ends of the back wall 16. This allows the lid 6 to be opened and closed while remaining connected to the storage compartment section 4 of the storage container 2. A set of latches 8 is attached to the lid 6 so that the lid 6 may be secured in the closed position by connecting the latches 8 to their counterparts on the front wall 12 of the storage container 2.

The present invention has been described with reference to certain preferred and alternative embodiments that are intended to be exemplary only and not limiting to the full scope of the present invention.

We claim:

1. A storage container for a fishing lure, the storage container comprising:
   a. a back wall and a front wall;
   b. a first side wall connecting the back wall and the front wall;
   c. a second side wall connecting the back wall and the front wall;
   d. a bottom surface connected to the back wall, the front wall, the first side wall, and the second side wall to form a storage compartment;
   e. a lid attached to the back wall;
   f. a rod extending from the first side wall to the second side wall; and
   g. a storage bag comprising an internal compartment for storing a fishing lure, wherein the rod extends through a hole in a bottom portion of the internal compartment of the storage bag and the storage bag is slidable on the rod from the first side wall to the second side wall.

2. The storage container of claim 1, further comprising a second storage bag.

3. The storage container of claim 2, wherein a hole in the second storage bag receives the rod.

4. The storage container of claim 1, wherein the fishing lure is a spinnerbait.

5. The storage container of claim 1, wherein the lid is hingedly attached to the back wall.

6. The storage container of claim 1, further comprising a latch.

7. The storage container of claim 1, wherein the lid comprises a sealing ring.

8. A storage container for a fishing lure, the storage container comprising:
   a. a back wall and a front wall;
   b. a first side wall connecting the back wall and the front wall;
   c. a second side wall connecting the back wall and the front wall;
   d. a bottom surface connected to the back wall, the front wall, the first side wall, and the second side wall to form a storage compartment;
   e. a lid attached to the back wall;
   f. a continuous rod extending from a bottom portion of the first side wall to a bottom portion of the second side wall; and
   g. a storage bag comprising an internal compartment for storing a fishing lure, wherein the rod extends through a hole in a bottom portion of the internal compartment of the storage bag and the storage bag is slidable on the rod from the first side wall to the second side wall.

* * * * *